Patented Apr. 9, 1929.

UNITED STATES PATENT OFFICE.

HENRY V. WILLE, OF PHILADELPHIA, PENNSYLVANIA.

PROCESS OF WELDING CAST IRON AND FILLER ROD THEREFOR.

No Drawing.  Application filed April 14, 1921. Serial No. 461,408.

My invention relates to welds and welding on cast iron, and particularly to fusion welds such as are commonly made by melting down a metal rod with the electric arc or with an oxyacetylene torch. Welds of this character hitherto produced on grey cast iron have had the draw-back of being so hard as to be practically unmachinable; and while their hardness can be removed by annealing the whole welded piece at a temperature of some 900° C. for several hours, and can even be forestalled and prevented by preheating the piece to red heat or higher and making the weld while the piece is hot, both of these expedients are slow, difficult, inconvenient, costly, and often quite impracticable,—especially for large castings.

The object of my invention is to produce on cast iron relatively soft fusion welds which will not interfere with machining and like operations on welded pieces. Through my invention, this can be done without preheating, annealing, or other tedious special methods. The invention is very useful for remedying blow-holes and other defects, as well as for altering and repairing cast iron parts generally.

An understanding of the hardness of welds on cast iron must be sought in the nature and properties of cast-iron, and in the conditions and phenomena of the fusion-welding operation; and a brief preliminary consideration of such matters will aid in the explanation of my invention.

Cast iron differs from steel in that it contains over 2% carbon,—usually 3½% to 4%. The carbon of cast iron may be entirely "combined," in the condition of iron carbide dissolved in the iron; or it may be partly graphitic, in the condition of minute free particles of the form of carbon known as "graphite" scattered through the iron. When the carbon of cast-iron is mostly combined, the iron is nearly white in color (when cold), and so hard as to be practically unmachinable; when the carbon is mostly graphitic, the fine particles render the iron grey in color (when cold), and provide cleavage planes and lubrication that render it readily machinable by suitable cutting tools.

Carbon to the amount of 3½ to 4% is normally dissolved in or combined with the iron. Various factors influence the condition of carbon in cold cast iron. Rapid cooling or chilling of the iron from about its fusion point or its critical temperature tends to leave the carbon mostly combined, while slow cooling allows it to precipitate or separate out as graphite.

I have discovered that it is possible to make soft machinable welds on cast iron, by means of material embodied in the weld which obviates or prevents the carbonaceous effects that cause hardness. Such material may be introduced and incorporated in the weld in various ways. The effect of the material relied on may be variously produced, e. g.:

(A) Through the absence of iron from the weld to a greater or less extent, with substitution therefor of other metal immune to hardening by carbon.

(B) By rendering iron in the weld "immune", so to speak, to hardening by carbon.

(C) Through the absence and virtual exclusion of carbon from the weld, contrary to its natural tendency to diffuse into it.

(D) By reducing the heating effect of the weld on the iron of the piece.

(E) By insuring an adequate amount of graphitic carbon in the weld, even after chilling.

More than one of these modes of action may, of course, be involved in a given case.

(I) One way of carrying out my invention is to use a metal filler not susceptible of any considerable degree of carbonaceous hardening under the conditions of fusion welding; in other words, "immune" to hardening by carbon. Suitable filler metal for this purpose is nickel, or a copper-nickel alloy such as "Monel metal". Either of these should preferably be used with a deoxidizer, such as manganese or aluminum, or boron for example. Nickel and manganese may conveniently be used in the form of a rod of 95 parts nickel and 5 parts manganese alloyed together; Monel metal may be used in the form of a rod coated with aluminum or chemically combined therewith.

Alloy filler metal containing iron in such liberal proportion as consistent with substantial immunity of the alloy to carbonaceous hardening effects is especially advantageous on account of the strength, compactness, and relative freedom from blow-holes which the ferrous component seems to confer on the welds. Here the relations between the iron and the non-ferrous portion of the composite filler are such that the latter renders the iron virtually immune to hardening by carbon. In general, the iron should not substantially exceed 50% of the filler, and in some combinations may need to be substantially less. A good combination of this character is an alloy comprising cast iron, wrought iron, or soft steel together with "immune" metal or metals suitable for use alone,—such as a copper-nickel alloy along with a slightly less amount of ferrous metal. Good results are obtained by using a composite filler rod comprising 20% copper, 40% nickel, and 40% cast iron alloyed together; or one of 52.3% nickel, 2.7% manganese, and 45% iron alloyed together. Aluminum here to the extent of a few per cent is advantageous.

In using alloy fillers, it is not, of course, always necessary that the alloy which is to constitute the ultimate filler embodied in the weld be formed previous to the welding operation. On the contrary, it may be formed during that operation, by then and there fusing its components together in suitable proportions. For example, a composite filler-rod may be used consisting of a core of Monel metal in a shell of ferrous metal, or vice-versa,—the relative transverse dimensions and the individual composition of core and shell corresponding properly to the desired proportions of various constituents in the ultimate filler metal, or the components may be in separate rods, one of which, if desired, may serve as an electrode for drawing a fusing arc.

"Immune" metal fillers are most conveniently used with the electric arc or with the torch, and in rod form. Welds produced by means of the electric arc or the torch with properly selected "immune" metal fillers (such as I have just described) are sound, strong, soft, and readily machinable; and in color and general appearance they differ very little from the grey cast iron with which they are associated. It is but very rarely indeed that the edges of the weld present any discernible hardness, even to the extent of a spot or line of minute thickness; on the contrary, the favorable influence of the immune metal seems to extend into the weld-strata of the pieces that are heated above their critical temperature in the welding operation and prevent chill-hardening from their carbon becoming recombined with the hot iron. In short, carbonaceous hardening effects are prevented throughout the hot weld zone, either from any carbon in the filler metal of the weld proper, or from carbon in the weld strata of the piece.

This way of carrying out my invention exemplifies (A) and (B) supra.

(II) Another method of carrying out my invention resembles methods described above (I) in that the filler comprises both ferrous metal or the like and metal substantially immune to hardening by carbon, and that the relations between the iron and the immune portion of the filler are such that the latter renders the iron immune to hardening by carbon under the conditions of the welding operation. It is distinguished, however, by the fact that the immune and ferrous components of the composite filler are not alloyed together throughout the weld, and that the proportion of iron in the composite filler may be much greater.

Accordingly to this other way, the weld is made by first applying to the piece the immune portion of the filler in the form of a coating layer or stratum that is integrally united or interfused with the metal of the piece, and then filling out and completing the weld with ferrous metal of non-hardening character. This layer may be applied by an autogenous welding or other process. The initial layer of the filler being impermeable to carbon, it protects the rest of the filler against contamination therewith from the piece. The initial layer or stratum of weld may consist of aluminum or of Monel metal sprayed on to a thickness of as much as 1/8th of an inch; or the initial layer may be fusion-welded to the metal of the piece, and may consist of nickel, Monel-metal, or of any such immune filler metal as described above (I),— even, under some circumstances, of a ferrous alloy,—to about the same thickness (1/8th inch). The non-hardening ferrous portion of the filler may consist of soft, low-carbon steel fusion-welded to the initial layer according to ordinary practice; or it may consist of iron made non-hardening as described hereinafter.

(If "immune" metal were welded to the initial layer to complete the weld, the result would in general be, of course, a mere obvious variant of the methods described (I) above.)

When my invention is carried out in this way, the weld is sound, strong, readily machinable, and entirely free from any trace of hardness,—the latter especially when the initial layer of immune metal is applied by spraying. The immune layer not only prevents the rest of the filler from absorbing carbon from the weld-strata of the piece, but also absorbs so much heat from the rest of the filler that the weld-strata of the piece are not raised above their critical temperature. Hence there is no chance for thin hard lines or spots to form about the edges of the weld as a result of chilling of the weld-strata of the piece after they have been heated above the critical temperature and their graphitic carbon has become combined. In a word, the immune layer serves as insulation against heat as well as against carbon; and chill-hardening effects from carbon in the weld strata of the piece are thereby prevented throughout the hot weld zone.

This way of carrying out my invention exemplifies (B), (C), and (D).

(III) Yet another method of carrying out my invention is to use iron as the filler metal and incorporate with it auxiliary material which will assure an adequate amount of graphitic carbon in the weld. The best auxiliary material for this purpose now known to me is carbon itself when present in substantial excess over the amount required for saturation of cast iron at its fusion point; for when a sufficient excess is present in the fused filler, graphitic precipitation of a considerable amount of carbon on cooling is assured,— no matter how rapid the cooling. Another valuable auxiliary material for the purpose is silicon, whose precipitant influence on carbon in cast iron has already been mentioned. When the amount of silicon in the cast iron is about 3 to 3½%, its influence is a maximum; and nearly all the carbon in the cold iron will then be graphitic unless the cooling has been exceedingly rapid. In percentages varying a little either way from 3 to 3½%, it still tends very strongly to precipitate carbon during cooling. In practice, I have obtained the best results by using considerable percentages of both silicon and carbon to assure graphitic precipitation in the weld.

Welds with such considerable percentages of auxiliary materials in the filler may be made by various methods. One method is to pour into the defect to be repaired (for example) a charge of molten cast iron "superheated" in a small electric furnace to a temperature (say 1600° to 2000° C. or higher) much above its fusion point, and containing an excess of carbon over its 4.6% saturation at ordinary coke or cupola furnace temperatures. Here the high temperature of the molten filler has a twofold function: It enables the iron to absorb up to 8% or more carbon the upper limit being 20% carbon, and it affords an excess heat to bring the weld-strata of the piece up to the melting-point, so as to interfuse and weld with the filler. An electric arc or a torch may preferably be used to keep the filler fluid after pouring until interfusion with the piece takes place, so as to obviate the necessity of pouring the charge at an extreme temperature. If silicon is used in this superheated filler charge, it may preferably be present in excess of 3½% (say a total amount as high as 5%) to off-set loss by oxidation and slagging. The term "supersaturated," used in the specification and claims, refers to the presence of carbon in the graphitic state, the percentage of total carbon being in excess of 4.0%.

When the weld is to be formed by fusing down a filler-rod, the rod may be cast by pouring into a mold metal which has been similarly superheated to 1600° C. or over in an electric furnace and surcharged with carbon. By this means it is possible to assure the necessary excess of carbon in the rod in spite of its tendency to burn out as "kish" during cooling. An excess amount of carbon should be secured in the rod; for in active welding with an arc, the strong, oxidizing atmosphere all around will oxidize much of the carbon on the fringe of the arc as the particles pass across to the object being welded, and hence the weld will contain less carbon than the rod. When silicon is used in such a rod, there should be again, an excess of it over the 3½% required to produce the maximum precipitation effect; for during welding part of it will be lost through its deoxidizing action and the resultant slagging. About 5% silicon in the rod will ordinarily suffice. The silicon cuts down the absorption of carbon by the iron at ordinary temperature C. from 4.6% to about 3.%. This is of course increased by increased temperatures, and is more than offset by the silicon's precipitant influence during cooling.

In welding with filler in rod form, it is not, of course, necessary that the auxiliary material be combined with the iron or suspended through it, but only that it be present in the cross section of the rod in suitable percentages from point to point of its length. Thus the iron may be in the form of a shell and all or part of the auxiliary material in the form of a core enclosed therein; or iron may form the core and the auxiliary material a shell or coating thereon, or fine iron, carbon and ferrosilicon may be mixed with a suitable binder and extruded or pressed into rods. In this case, the carbon percentage based on the iron should be between 4.0% and 20.0%. In such cases, carbon (and silicon) in core or shell may advantageously be mixed with a small amount of inert material fusible at about the same temperature as the iron, so as to facilitate the easy and uniform passage of carbon to the weld with the iron. Here the intense heat of the arc superheats the iron and allows it to take up a surcharge of carbon.

Or, again, the iron and the auxiliary material (or part thereof) may be in entirely separate rods, separately manipulated. In particular, the arc may be drawn with a carbon rod as electrode, and an iron rod may be used as a filler proper. By proper manipulation with an arc kept much shorter than usual, welds may be rendered soft enough to be machinable by superheating of the iron in the arc and surcharge thereof with carbon from the carbon electrode. Here, again, admixture of an inert fusible material with the carbon may prove advantageous.

Regardless of the specific method employed in carrying out my invention in this way, the auxiliary material used prevents carbonaceous chill-hardening effects throughout the hot weld zone, either from carbon in the filler metal of the weld proper, or from carbon in the weld strata of the piece. As regards the weld strata of the piece, this beneficial effect is due to the diffusion of the auxiliary material from the filler into the hot weld strata as such an excess of carbon that it must largely come down as graphite, over and above what may be combined. Such entire absence of hardening from the whole region of the weld is of great advantage in some cases, where hard areas of minute thickness surrounding the soft filler metal cause trouble.

This way of carrying out my invention affords another advantage besides softness of the weld: The shrinkage of the weld is very greatly reduced in consequence of the formation of graphite crystals therein, thus minimizing shrinkage strains in the welded piece. If all the carbon in the iron goes into the graphitic state on cooling, its shrinkage is only half as much as when the carbon remains combined. Shrinkage is also minimized by the presence in the iron of phosphorus up to about 1/2%.

This way of carrying out my invention exemplifies (E) supra.

I claim:

1. In the method of producing a soft fusion weld on cast iron, the step which consists in adding to the weld with ferrous metal supersaturated carbon, the ferrous metal containing more than 4.0% total carbon and less than 20%.

2. A filler for fusion welding on cast iron, comprising cast iron supersaturated with carbon, the total carbon content being more than 4.0% and less than 20%.

3. In the process of welding cast iron in a heat welding service the step which consists in adding to the weld carbon in excess of 4% and less than 20% in order to form comparatively large amounts of free carbon at and in the weld.

4. A weld stick having cast iron particles and carbon particles as two of its constituents, and formed into a stick by a binder the percentage of said carbon being in excess of 4% and less than 20%.

5. In the method of welding cast iron in a heat welding service, the step which consists in adding a proportion of carbon in excess of four percent of the metal added and used in the welding operation.

6. A process of welding cast iron by the electric arc, comprising the step of subjecting the metal to be welded to the action of a grey cast iron electrode, while adding carbon to the fused metal of the weld, thereby to form a weld embodying soft and easily workable cast iron.

7. A process of welding cast iron by the electric arc which comprises flowing the electric current through a grey cast iron electrode while adding carbon to the weld.

8. In the method of welding cast iron by the electric arc, the step which comprises flowing the electric current through a grey cast iron electrode which is charged with a body substantially composed of carbon.

HENRY V. WILLE.